T. E. MURRAY, Jr., AND J. B. MURRAY.
METHOD OF PRODUCING A RIB ON AN ELECTRICALLY WELDED JOINT.
APPLICATION FILED NOV. 25, 1919.

1,339,966.

Patented May 11, 1920

Inventors
Thomas E. Murray Jr.
Joseph B. Murray

By Park Benjamin
Their Attorney

UNITED STATES PATENT OFFICE.

THOMAS E. MURRAY, JR., AND JOSEPH B. MURRAY, OF BROOKLYN, NEW YORK.

METHOD OF PRODUCING A RIB ON AN ELECTRICALLY-WELDED JOINT.

1,339,966.  Specification of Letters Patent.  Patented May 11, 1920.

Application filed November 25, 1919. Serial No. 340,607.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Producing a Rib on an Electrically-Welded Joint, of which the following is a specification.

The invention is a method of producing at an electrically welded joint, a strengthening rib of predetermined shape and dimensions simultaneously with the welding of said joint.

In the accompanying drawing—

Figure 1:
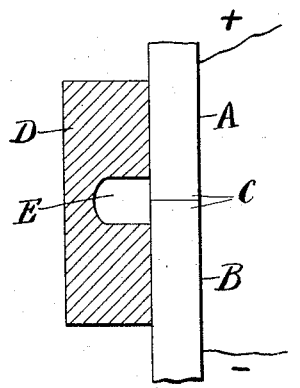
Figure 2:
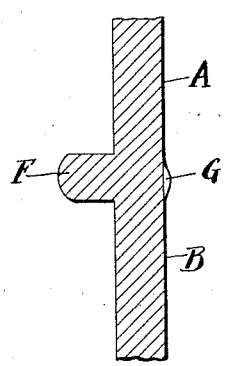
Figure 3:
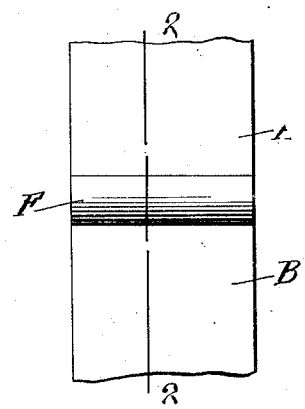
Figure 4:
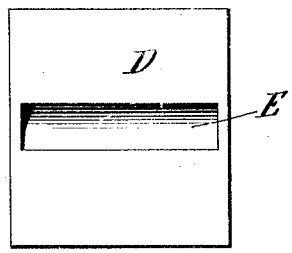
Figure 5:
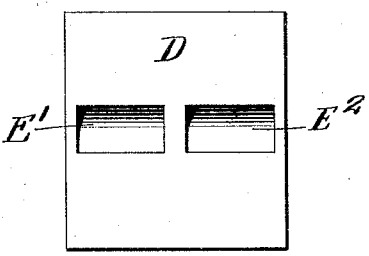
Figure 6:
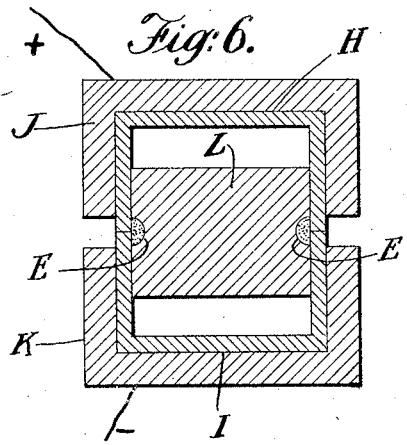
Figure 7:
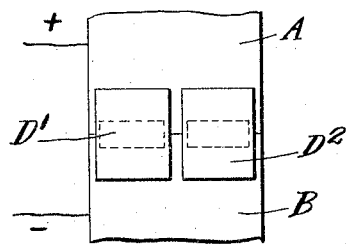

Figure 1 shows in section two objects in edge contact to be welded and the mold for producing the rib in position. Fig. 2 is a section of the welded objects and rib produced thereon, on the line 2, 2 of Fig. 3. Fig. 3 is a face view of the welded objects and rib. Fig. 4 is a face view of a mold for making a single rib. Fig. 5 is a face view of a mold for making a plurality of ribs. Fig. 6 is a transverse section of two half sections of a hollow object to be welded at their edges, showing the mold as a core within said object and constructed to produce a strengthening rib at each welded joint. Fig. 7 shows a plurality of molds, each with a recess in its face, and all receiving extruded metal from the joint to form a plurality of ribs.

Similar letters of reference indicate like parts.

A and B are the portions immediately adjacent to the joint, of two plates to be electrically welded. At each edge is a take-up C. D is a mold, preferably of refractory material, having in its face a recess E of any desired configuration. Said mold is fixed in place in proximity to the said plates, with the recess spanning said joint. The welding current being established, the plates are pressed together, when the metal of the take-ups being melted is extruded into the recess E and takes the shape thereof, as shown at F. Any extruded metal G which may appear on the other side of the joint may be cut off.

Instead of forming a single recess E in the weld, we may form a plurality of recesses, as E', E², Fig. 5, all of which will be filled simultaneously by the extruded metal to produce a number of ribs. Where a hollow object formed of two half sections H, I, Fig. 6, welded together at their edges is to be made, we place said sections in electrodes J, K, and dispose between said sections a core L, preferably of refractory material, in opposite sides of which are recesses E which become filled with the metal extruded from the joint, as already described. Instead of making a plurality of recesses in a single mold, as shown in Fig. 5, we may use a plurality of molds D', D², Fig. 7, with a recess of desired shape and dimensions in each.

We claim:

1. The method of producing at an electrically welded joint between metal plates, a strengthening rib of predetermined shape and dimensions, which consists in placing a fixed mold, having in one face a recess corresponding in shape and dimensions to the desired rib, against said plates, with said recess spanning the joint, establishing welding current and pressing said plates together, whereby the metal extruded at said joint is caused to enter and fill said mold and conform to the shape thereof.

2. The method of producing at an electrically welded joint between metal plates, a plurality of strengthening ribs of predetermined shapes and dimensions, which consists in placing a fixed mold, having in one face a plurality of recesses corresponding in shapes and dimensions to said ribs, against said plates with said recesses spanning the joint, establishing welding current and pressing said plates together, whereby the metal extruded at said joint is caused to enter and fill said recesses and conform to the shapes thereof.

3. The method of producing at an electrically welded joint between metal plates, a plurality of strengthening ribs of predetermined shapes and dimensions, which consists in placing a plurality of fixed molds, each having a recess corresponding in shape and dimensions to one of said ribs, against said plates with said recesses spanning the joint, establishing welding current and pressing said plates together, whereby the metal extruded at said joint is caused to enter and fill said molds and conform to the shapes thereof.

4. The method of producing at an electrically welded joint between plates stationary in position and relatively movable, a strengthening rib of predetermined shape and dimensions, which consists in placing a fixed mold, having in one face a recess corresponding in shape and dimensions to the desired rib, against said plates with said recess spanning the joint, establishing welding current and pressing said plates together, whereby the metal extruded at said joint is caused to enter and fill said mold and conform to the shape thereof.

5. The method of producing at electrically welded joints between the edges of two trough-shaped objects of plate metal strengthening ribs of predetermined shapes and dimensions on the inner side of said welded joints, which consists in placing in the space within said trough-shaped objects a fixed mold having in its opposite faces recesses corresponding in shapes and dimensions to the desired ribs with said recesses spanning said joints, establishing the welding current and pressing said objects together, whereby the metal inwardly extruded at said joints is caused to enter and fill said recesses and conform to the shapes thereof.

In testimony whereof we have affixed our signatures in presence of two witnesses.

THOMAS E. MURRAY, Jr.
JOSEPH B. MURRAY.

Witnesses:
GERTRUDE T. PORTER,
MAY T. McGARRY.